US011894588B2

United States Patent
Rajagopal et al.

(10) Patent No.: US 11,894,588 B2
(45) Date of Patent: Feb. 6, 2024

(54) FUEL CELL PROPULSION SYSTEM WITH A FUEL CELL STACK FOR A MOTOR VEHICLE AND PROCESS FOR CONTROLLING A TEMPERATURE OF THE FUEL CELL STACK

(71) Applicant: GM Global Technology Operations LLC, Detroit, MI (US)

(72) Inventors: Karthikeyan Rajagopal, Rochester Hills, MI (US); Brian David Neilson, Berkley, MI (US); Sergio Eduardo Garcia, Commerce Township, MI (US); Christopher L Koppen, Webster, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 17/474,715

(22) Filed: Sep. 14, 2021

(65) Prior Publication Data
US 2023/0079419 A1 Mar. 16, 2023

(51) Int. Cl.
*H01M 8/04746* (2016.01)
*H01M 8/0432* (2016.01)
*H01M 8/04029* (2016.01)
*H01M 8/0438* (2016.01)
*G05B 6/02* (2006.01)

(52) U.S. Cl.
CPC .......... *H01M 8/04768* (2013.01); *G05B 6/02* (2013.01); *H01M 8/04029* (2013.01); *H01M 8/04358* (2013.01); *H01M 8/04417* (2013.01); *H01M 2250/20* (2013.01)

(58) Field of Classification Search
CPC ......... H01M 8/04029; H01M 8/04358; H01M 8/04417; H01M 8/04768
See application file for complete search history.

(56) References Cited

U.S. PATENT DOCUMENTS

| 6,360,835 | B1 | 3/2002 | Skala |
| 6,866,955 | B2 | 3/2005 | Lee et al. |
| 6,979,508 | B2 | 12/2005 | Gurin et al. |
| 7,749,632 | B2 | 7/2010 | Zhang et al. |

(Continued)

FOREIGN PATENT DOCUMENTS

CN 110649281 * 1/2020

OTHER PUBLICATIONS

English translation of CN Publication 110649281, Jan. 2020.*

*Primary Examiner* — Brittany L Raymond
(74) *Attorney, Agent, or Firm* — Vivacqua Crane PLLC

(57) ABSTRACT

A computer is provided for a fuel cell propulsion system of a motor vehicle. The computer includes one or more processors receiving a temperature signal from one or more temperature sensors and a pressure signal from one or more pressure sensors. The computer further includes a non-transitory computer readable storage medium including instructions, such that the processor is programmed to determine a feedback correction based on the temperature of the coolant and the pressure drop of the coolant across the fuel cell stack. The processor is further programmed to generate a pump command signal based on the feedback correction and a nominal pump command, with the pump command signal actuating a pump to pump coolant at a target pump speed.

20 Claims, 5 Drawing Sheets

(56) References Cited

U.S. PATENT DOCUMENTS

| | | |
|---|---|---|
| 8,263,279 B2 | 9/2012 | Lienkamp et al. |
| 8,387,441 B2 | 3/2013 | Falta et al. |
| 8,855,945 B2 * | 10/2014 | Maier ............... H01M 8/04014 702/45 |
| 9,806,356 B2 | 10/2017 | Maslyn et al. |
| 10,003,092 B2 | 6/2018 | Kells et al. |
| 10,581,100 B2 | 3/2020 | Sinha et al. |
| 2004/0001985 A1 | 1/2004 | Alva |
| 2007/0065690 A1 | 3/2007 | Schaefer et al. |
| 2007/0065695 A1 | 3/2007 | Maier et al. |
| 2019/0379075 A1 | 12/2019 | Sinha et al. |

\* cited by examiner

FUEL CELL PROPULSION SYSTEM WITH A FUEL CELL STACK FOR A MOTOR VEHICLE AND PROCESS FOR CONTROLLING A TEMPERATURE OF THE FUEL CELL STACK

INTRODUCTION

The present disclosure relates to thermal sub-systems for fuel cell propulsion systems of motor vehicles, and more particularly to a computer actuating a pump to operate at a target pump speed based on a coolant temperature and a coolant pressure drop across a fuel cell stack.

Fuel Cell Electric Vehicles ("FCEVs") use a propulsion system where energy stored as hydrogen is converted to electricity by a fuel cell. Several fuel cells are typically combined in a fuel cell stack to generate a target amount of power. For FCEVs, the fuel cell stack may include two hundred or more individual cells. Each fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work can act to operate a vehicle.

Fuel cell stacks operate at an optimum relative humidity and temperature to provide efficient stack operation and durability. A typical stack operating temperature for automotive applications is in the range between 50° C. and 80° C., and a typical temperature gradient or delta T across the stack is in the range between 0° C. and 15° C. The stack temperature provides the relative humidity within the fuel cell stack for a particular stack pressure. Excessive stack temperatures above the optimum temperature may damage fuel cell components and reduce the lifetime of the fuel cells. Also, stack temperatures below the optimum temperature can cause an accumulation of liquid water that reduces the stack performance and damages the cells. Therefore, fuel cell systems include thermal sub-systems that control the temperature within the fuel cell stack to maintain a thermal equilibrium.

A typical thermal sub-system for an automotive fuel cell stack includes a radiator, a fan, a pump, and a coolant mixing valve. The pump moves a coolant, such as a water/glycol mixture, through coolant channels within the fuel cell stack where the coolant collects the stack waste heat. The coolant is directed through a pipe or hose from the stack to the radiator where it is cooled by ambient air either forced through the radiator from movement of the vehicle or by operation of the fan. Because the radiator airflow must reject a large amount of waste heat to provide a relatively low operating temperature, the fan is usually powerful and the radiator is relatively large. The physical size of the radiator and the power of the fan have to be higher than those of an internal combustion engine having a similar power rating because of the lower operating temperature of the fuel cell system and only a comparably small amount of heat is rejected through the cathode exhaust in the fuel cell system.

The fuel cell stack requires a certain coolant flow rate to maintain a predetermined differential temperature or delta temperature range across the fuel cell stack. Because fuel cell systems are thermally sensitive, the coolant flow typically requires a flow controller, such as a proportional-integral (PI) feedback controller. Feedback controllers typically require a proportionally controllable pump. Because these thermal sub-systems do not have pressure sensors, the thermal sub-systems utilize coolant temperature feedback for controlling coolant flow rate.

Currently, multiple temperature sensors are used to measure the temperature gradient across the fuel cell stack for controlling the pump. However, the temperature-gradient based feedback is sluggish because there is a delay in coolant transport and a delay in the temperature sensor measurements when the motor vehicle is in a transient state, e.g. when the vehicle is accelerating. In addition, calibrations of the temperature-gradient based feedback can be overestimated and produce noise caused by a phase lag associated with warm coolant having residual heat when the coolant returns to the stack.

Thus, while existing fuel cell propulsion systems achieve their intended purpose, there is a need for a new and improved fuel cell propulsion system that addresses these issues.

SUMMARY

According to several aspects of the present disclosure, a computer is provided for a fuel cell propulsion system of a motor vehicle. The system includes a fuel cell stack, a coolant passage coupled to the fuel cell stack for flowing a coolant through the fuel cell stack, and a pump for pumping the coolant through the coolant passage to remove the waste heat from the fuel cell stack. The system further includes one or more temperature sensors for generating a temperature signal associated with a temperature of the coolant and one or more pressure sensors for generating a pressure signal associated with a pressure drop of the coolant across the fuel cell stack. The computer includes one or more processors receiving the temperature signal from the temperature sensor and the pressure signal from the pressure sensor. The computer further includes a non-transitory computer readable storage medium including instructions, such that the processor is programmed to determine a feedback correction based on the temperature of the coolant and the pressure drop of the coolant across the fuel cell stack. The processor is further programmed to generate a pump command signal based on the feedback correction and a nominal pump command, with the pump command signal actuating the pump to operate at a target pump speed for pumping the coolant at a target flow rate.

In one aspect, the processor is further programmed to determine the feedback correction based on a delta temperature set point and a delta temperature feedback.

In another aspect, the processor is further programmed to determine a waste heat based on an ideal voltage from the fuel cell stack, an actual voltage from the fuel cell stack, an actual current generated by the fuel cell stack, and a latent heat. The processor is further programmed to determine an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and a density of the coolant at an average temperature of the coolant. The processor is further programmed to determine an estimated delta temperature associated with the pressure drop based on the waste heat, the estimated flow rate, a density of the coolant, and a specific heat capacity of the coolant.

In another aspect, the processor is further programmed to determine a high-pass filter input based on the estimated delta temperature and a loop instant number. The processor is further programmed to determine a high-pass filtered delta temperature associated with the pressure drop based on the high-pass filter input, the loop instant number, a time step, and a time constant associated. The processor is further programmed to determine the delta temperature feedback based on the high-pass filtered delta temperature, a low-pass filtered measured delta temperature associated with the temperature of the coolant, and the loop instant number.

In another aspect, the processor is further programmed to determine a measured delta temperature based on the temperature signal received from the temperature sensor. The processor is further programmed to determine the low-pass filtered measured delta temperature based on the measured delta temperature, the time step, the loop instant number, and the time constant.

In another aspect, the processor is further programmed to determine a rate of change of the pressure drop, in response to the at least one processor receiving the pressure signal from the at least one pressure sensor. The processor is further programmed to compare the rate of change of the pressure drop to a calibratable threshold. The processor is further programmed to define the delta temperature feedback as the estimated delta temperature, in response to the at least one processor determining that the rate of change of the pressure drop is above the calibratable threshold.

In another aspect, the processor is further programmed to determine a measured delta temperature, in response to the processor receiving the temperature signal from the temperature sensor. The processor is further programmed to define the delta temperature feedback as the measured delta temperature, in response to the processor determining that the rate of change of the pressure drop is below the calibratable threshold.

In another aspect, the processor is further programmed to determine the feedback correction based on a delta pressure set point and the pressure drop.

In another aspect, the processor is further programmed to determine the delta pressure set point based on a nominal delta pressure, a low-pass filtered measured delta temperature set point, and a low-pass filtered measured delta temperature associated with the temperature signal.

In another aspect, the processor is further programmed to determine the low-pass filtered measured delta temperature set point based on an unfiltered delta temperature set point, a time step, a loop instant number, and a time constant associated with a low-pass filter.

In another aspect, the processor is further programmed to determine the low-pass filtered measured delta temperature based on a measured delta temperature, the time step, the loop instant number, and the time constant.

In another aspect, the processor is further programmed to determine the measured delta temperature, in response to the processor receiving the temperature signal from the temperature sensor.

According to several aspects of the present disclosure, a fuel cell propulsion system for a motor vehicle includes a fuel cell stack for generating an electrical current with an associated waste heat. The system further includes a coolant passage having a coolant section coupled to the fuel cell stack and flowing a coolant through the fuel cell stack for removing the waste heat. The coolant passage further includes an inlet positioned upstream of the coolant section and an outlet positioned downstream of the coolant section. The system further includes one or more temperature sensors attached to the coolant passage and generating a temperature signal associated with a temperature of the coolant. The system further includes one or more pressure sensors attached to the coolant section of the coolant passage and generating a pressure signal associated with a pressure drop across the fuel cell stack. The system further includes a computer having one or more processors. The computer further includes a non-transitory computer readable storage medium including instructions. The processor is programmed to determine a feedback correction based on the pressure drop of the coolant across the fuel cell stack and the temperature of the coolant, in response to the processor receiving the temperature signal from the temperature sensor and the pressure signal from the pressure sensor. The processor is further programmed to generate a pump command signal based on the feedback correction and a nominal pump command. The system further includes a pump fluidly connected to the coolant passage and operating at a target pump speed for pumping the coolant through the coolant passage at a target flow rate, in response to the pump receiving the pump command signal from the at least one processor.

In one aspect, the at least one temperature sensor is a single temperature sensor.

In another aspect, the at least one temperature sensor includes an inlet temperature sensor attached to the coolant passage and positioned upstream of the coolant section, with the inlet temperature sensor generating an inlet temperature signal associated with an inlet temperature of the coolant upstream of the coolant section. The at least one temperature sensor further includes an outlet temperature sensor attached to the coolant passage and positioned downstream of the coolant section, with the outlet temperature sensor generating an outlet temperature signal associated with an outlet temperature of the coolant downstream of the coolant section.

According to several aspects of the present disclosure, a process is provided for operating a fuel cell propulsion system for a motor vehicle. The system includes a fuel cell stack, a coolant passage coupled to the fuel cell stack for flowing a coolant through the fuel cell stack, and a pump. The system further includes one or more temperature sensors attached to the coolant passage and one or more pressure sensors attached to the coolant passage. The system further includes a computer having one or more processors and a non-transitory computer readable storage medium for storing instructions. The process includes the fuel cell stack generating an electrical current with an associated waste heat. The process further includes the coolant flowing through the coolant passage. The temperature sensor generates a temperature signal associated with a temperature of the coolant, and the pressure sensor generates a pressure signal associated with a pressure drop of the coolant across the fuel cell stack. The processor determines a feedback correction based on the pressure drop of the coolant across the fuel cell stack and the temperature of the coolant, in response to the processor receiving the temperature signal from the temperature sensor and the pressure signal from the pressure sensor. The processor generates a pump command signal based on the feedback correction and a nominal pump command. The pump operates at a target pump speed to pump the coolant through the coolant passage at a target flow rate, in response to the pump receiving the pump command signal from the processor.

In one aspect, the processor further determines the feedback correction based on a delta temperature set point and a delta temperature feedback.

In another aspect, the processor further determines a waste heat based on an ideal voltage from the fuel cell stack, an actual voltage from the fuel cell stack, an actual current generated by the fuel cell stack, and a latent heat. The processor further determines an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and a density of the coolant at an average temperature of the coolant. The processor further determines an estimated delta temperature associated with the pressure drop based on the waste heat, the estimated flow rate, a density of the coolant, and a specific heat capacity of the coolant. The processor further determines a high-pass filter input based on the estimated delta temperature and a loop instant number. The processor further determines a high-pass filtered delta temperature associated with the pressure drop based on the high-pass filter input, a time constant associated with the high-pass filter, a time step, the loop instant number, and the low-pass filter. The processor further determines a measured delta temperature, in response to the processor receiving the temperature signal from the temperature sensor. The processor further determines a low-pass filtered measured delta temperature associated with the temperature of the coolant based on the measured delta temperature, the time step, the loop instant number, and the time constant. The processor further determines the delta temperature feedback based on the high-pass filtered delta temperature, the low-pass filtered measured delta temperature, and the loop instant number.

In another aspect, the processor further determines a rate of change of the pressure drop of the coolant and compares the rate of change of the pressure drop to a calibratable threshold. The processor defines the delta temperature feedback as a measured delta temperature based on the temperature signal, in response to the processor determining that the rate of change of the pressure drop is less than the calibratable threshold. The processor defines the delta temperature feedback as an estimated delta temperature based on the pressure signal, in response to the processor determining that the rate of change of the pressure drop is above the calibratable threshold. Defining the delta temperature feedback as the estimated delta temperature comprises includes the processor determining a waste heat generated by the fuel cell stack based on an ideal voltage from the fuel cell stack, an actual voltage from the fuel cell stack, an actual current generated by the fuel cell stack, and a latent heat. The processor further determines an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and the density of the coolant. The processor further determines the estimated delta temperature based on the waste heat, the estimated flow rate, a density of the coolant, and a specific heat capacity of the coolant.

In another aspect, the processor further determines a measured delta temperature in response to the processor receiving the temperature signal from the temperature sensor. The processor further determines a low-pass filtered measured delta temperature based on the measured delta temperature associated, a time step, a loop instant number, and a time constant associated with a low-pass filter. The processor further determines a low-pass filtered measured delta temperature set point based on an unfiltered delta temperature set point, the time step, the loop instant number, and the time constant. The processor further determines a nominal delta pressure based on a coefficient of laminar flow associated with the coolant, a viscosity of the coolant at the average temperature of the coolant, an estimated flow rate of the coolant, a coefficient of turbulent flow associated with the coolant, and a density of the coolant at an average temperature of the coolant. The processor further determines a delta pressure set point based on the nominal delta pressure, the low-pass filtered measured delta temperature, and the low-pass filtered measured delta temperature set point. The processor further determines the feedback correction based on the delta pressure set point and the pressure drop.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
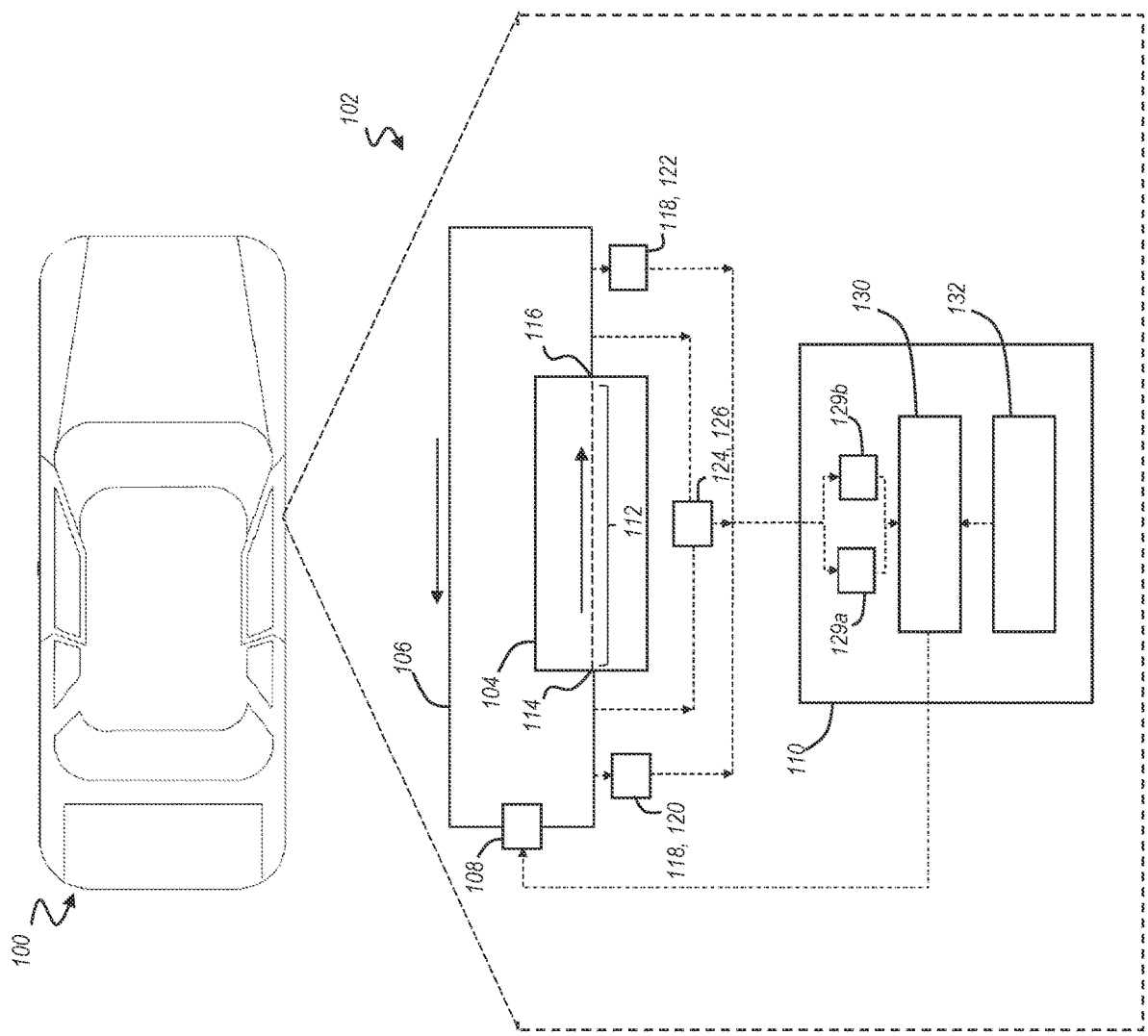
FIG. 1 is a schematic view of one example of a fuel cell electric vehicle having a fuel cell propulsion system with a fuel cell stack, a coolant passage, a pump, and a computer for actuating a pump to control a flow rate of coolant through the coolant passage.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, one non-limiting example of a motor vehicle 100 includes a fuel cell propulsion system 102 ("system") having a fuel cell stack 104, a coolant loop 106 (circuit or passage), a pump 108, and a computer 110 for controlling the pump 108 based on heterogeneous feedback from two different sensors that detect the state of coolant flow through the fuel cell stack 104. A first example of the heterogeneous feedback is a measured pressure drop in the coolant across the fuel cell stack. The measured pressure drop is used to estimate a differential temperature ("delta temperature") across the fuel cell stack, which is in turn used to determine a pump command and associated pump speed. While this pressure-based feedback indirectly determines delta temperature across the fuel cell stack, the pressure-based feedback provides a fast reliable response, which can be useful during a transient state of the system 102, e.g., when the vehicle is accelerating. A second example of the heterogeneous feedback is a direct measurement of coolant temperature across the active area of the fuel cell stack during a steady state of the system 102, e.g., when the vehicle is cruising at a fixed speed. The heterogeneous feedback based on both the measured pressure drop and the measured delta temperature provides a robustness against both dynamic and steady state uncertainties in coolant loop pressure drop variations. The use of measured pressure drops as feedback mitigates coolant flow fluctuations during transient states as compared to systems operating exclusively on delta temperature feedback. While the non-limiting examples described below are directed to a fuel cell power generation system in the form of a propulsion system for a motor vehicle, it is contemplated that the fuel cell power generation system can be implemented for any mobile or stationary power generation system.

The system 102 calibrates a temperature-based model using pressure drop in coolant flow across only the fuel cell stack. While the coolant loop 106 may further include multiple hoses, manifolds, wobble tubes, a high-temperature radiator, plumbing to the high-temperature radiator, and various other components having associated coolant pressure drops, the exemplary system and associated pump control strategy do not depend on the pressure drop across these components. Because this non-limiting example of the system 102 consists of a single pressure drop sensor for measuring the pressure drop across only the fuel cell stack and none of the other components, non-limiting benefits of the system 102 can include a reduction in sensors, a reduction in collected data, a decrease in noise, and a reduction in overall training, calibration, and development time. It is contemplated that other examples of the control strategy may be based on pressure drop across other components of the coolant circuit. Furthermore, because the pressure sensor has a faster response time than the temperature sensors which provide long-term correction, the system 102 can provide a precise and accurate pump control strategy, as compared to conventional systems that control the pump based on only measured coolant temperatures.

The motor vehicle 100 can be an electric land vehicle, such as a car or a truck. The fuel cell stack 104 is configured to generate an electrical current for propelling the vehicle 100, and a byproduct of the electrical current is an associated waste heat. The coolant loop, circuit, or passage 106 includes a coolant section 112 that is coupled to the fuel cell stack 104 for flowing a coolant to remove the waste heat from the fuel cell stack 104. In one example, the coolant section 112 is one or more channels or flow paths defined by a casing or body of the fuel cell stack 104. The coolant passage 106 includes an inlet 114 positioned upstream of the coolant section 112 and an outlet 116 positioned downstream of the coolant section 112. The pump 108 is fluidly connected to the coolant passage 106 for operating at a target pump rate to pump a coolant through the coolant passage 106 at a target pump speed, in response to the pump 108 receiving a pump command signal from the computer 110 as described in detail below.

The system 102 further includes one or more temperature sensors 118 attached to the coolant passage 106 for generating a temperature signal associated with a temperature of the coolant. In this example, the temperature sensors 118 include an inlet temperature sensor 120 that is attached to the inlet 114 of the coolant section 112, such that the inlet 114 is disposed external to the fuel cell stack 104 and upstream of the coolant section 112. The inlet temperature sensor 120 generates an inlet temperature signal associated with an inlet temperature of the coolant upstream of the coolant section 112. The system 102 further includes an outlet temperature sensor 122 that is attached to the outlet 116 of the coolant section 112, such that the outlet 116 is disposed external to the fuel cell stack 104 and downstream of the coolant section 112. The outlet temperature sensor 122 generates an outlet temperature signal associated with an outlet temperature of the coolant downstream of the coolant section 112. It is contemplated that the system can have more than two temperature sensors or a single temperature sensor as described below.

The system 102 further one or more pressure sensors 124 attached to the coolant passage 106 for detecting a pressure drop across the fuel cell stack 104. In this non-limiting example, the system 102 includes a single pressure sensor 126, which is attached to the coolant passage 106 and generates a pressure signal associated with a measured pressure drop of the coolant across only the fuel cell stack 104. In this non-limiting example, the pressure sensor 126 is the sole pressure sensor coupled to the coolant passage 106, so as to minimize the number of pressure sensors, minimize the time spent on developing or calibrating the system, and minimize noise associated with a plurality of pressure sensors that detect pressure drops across multiple components of the system. However, it is contemplated that other non-limiting examples of the system can have two or more pressure sensors, e.g., absolute pressure sensors and/or delta pressure sensors, for detecting pressure drop across any number of components.

The computer 110 includes one or more processors 130 and a non-transitory computer readable storage medium 132 ("CRM") including instructions, such that the processor 130 is programmed to determine a feedback correction based on the temperature of the coolant and the pressure drop of the coolant across only the fuel cell stack 104, in response to the processor 130 receiving the temperature signal from the temperature sensor 118, 120, 122 and the pressure signal from the pressure sensor 124, 126. As described in the detailed non-limiting examples below, the processor 130 is programmed to generate the pump command signal based on the feedback correction and a nominal pump command, with the pump command signal actuating the pump 108 to pump the coolant at a target flow rate.

In one non-limiting example, the system 102 uses complimentary high-pass- and low-pass filters 129a, 129b for real-time signal blending to determine a feedback correction FC. More specifically, the processor 130 is further programmed to determine the estimated flow rate of the coolant through the coolant passage 106 based on the pressure drop, a coefficient of laminar flow associated with the coolant, a viscosity of the coolant at the average temperature of the coolant, a coefficient of turbulent flow associated with the coolant, and a density of the coolant at an average temperature of the coolant. The estimated flow rate can be determined by Equation 1:

$$dP_m = a_{Lam}\mu_{T,avg}dV_{Stack} + a_{Turb}\rho_{T,avg}(dV_{Stack})^2 \qquad \text{Eq. 1}$$

where $dV_{Stack}$ represents the estimated flow rate of the coolant through the fuel cell stack 104; $dP_m$ represents the measured pressure drop across only the fuel cell stack; $a_{Lam}$ represents a coefficient of laminar flow associated with the coolant; $\mu_{T,avg}$ represents a viscosity of the coolant at its average temperature; $a_{Turb}$ represents a coefficient of turbulent flow associated with the coolant; and $\beta_{T,avg}$ represents the coolant density.

The processor 130 is further programmed to determine the waste heat based on an ideal voltage from the fuel cell stack, an actual voltage from the fuel cell stack, an actual current generated by the fuel cell stack, and a latent heat. The waste heat can be determined by Equation 2:

$$\dot{Q} = (V_{Ideal} - V)I + \text{Latent Heat} \qquad \text{Eq. 2}$$

where $\dot{Q}$ represents the waste heat generated by the fuel cell stack 104; $V_{Ideal}$ represents the ideal voltage from the fuel cell stack 104; V represents the actual voltage from the fuel cell stack 104; and I represents the actual current generated by the fuel cell stack 104.

The processor 130 is further programmed to determine an estimated delta temperature based on the estimated flow rate $dV_{Stack}$ of the coolant through the coolant passage, the waste heat $\dot{Q}$ generated by the fuel cell stack 104, a density of the coolant, and a specific heat capacity of the coolant. The estimated delta temperature can be determined by Equation 3:

$$dT_p(k+1) = \frac{\dot{Q}}{\rho C_p dV_{Stack}} \qquad \text{Eq. 3}$$

where $dT_p$ represents the estimated delta temperature; k represents the loop instant number; p represents the density of the coolant; $C_p$ represents the specific heat capacity of the coolant; and dT represents the difference between the outlet temperature and the inlet temperature.

The processor 130 is further programmed to determine a high-pass filter input based on the estimated delta temperature $dT_p$ and the loop instant number k. The high-pass filter input can be determined by Equation 4:

$$\Delta dT_p = dT_p(k+1) - dT_p(k) \qquad \text{Eq. 4}$$

where $\Delta dT_p$ represents the high-pass filter input.

The processor 130 is further programmed to determine a high-pass filtered delta temperature associated with the pressure drop, based on the high-pass filter input $\Delta dT_p$, the loop instant number k, a time step of the control loop used in software implementation, and a time constant associated with a high-pass filter and a low-pass filter. The high-pass filtered delta temperature can be determined by Equation 5:

$$dT_{pf}(k+1) = dT_{pf}(k)\left(\frac{\tau}{\tau + \Delta t}\right) + \left(\frac{\tau}{\tau + \Delta t}\right)\Delta dT_p \qquad \text{Eq. 5}$$

where $dT_{pf}$ represents the high-pass filtered delta temperature; $\Delta t$ represents the time step; and $\tau$ represents the time constant.

The processor 130 is further programmed to determine a measured delta temperature $dT_m$ based on the temperature signals received from the associated inlet and outlet temperature sensors 120, 122. The processor 130 is further programmed to determine a low-pass filtered measured delta temperature based on the time step $\Delta t$, the loop instant number k, the measured delta temperature $dT_m$, and the time constant $\tau$ associated with the low-pass filter. The low-pass filtered measured delta temperature can be determined by Equation 6:

$$dT_{mf}(k+1) = dT_{mf}(k)\left(1 - \frac{\Delta t}{\tau}\right) + \frac{\Delta t}{\tau}dT_m \qquad \text{Eq. 6}$$

where $dT_{mf}$ represents the low-pass filtered measured delta temperature.

The processor 130 is further programmed to determine a delta temperature feedback based on the high-pass filtered delta temperature $dT_{pf}$, the low-pass filtered measured delta temperature $dT_{mf}$, and the loop instant number k. The delta temperature feedback $dT_{Feedback}$ can be determined by Equation 7:

$$dT_{Feedback} = dT_{pf}(k+1) + dT_{mf}(k+1) \qquad \text{Eq. 7}$$

The processor 130 is further programmed to determine the feedback correction FC based on the delta temperature feedback $dT_{Feedback}$ and a delta temperature set point $dT_{Sp}$. The feedback correction FC can be determined by Equation 8:

$$FC = (dT_{Sp} - dT_{Feedback})*PG + \int(dT_{Sp} - dT_{Feedback})*IG*dt \qquad \text{Eq. 8}$$

where PG represents proportional gain; and IG represents integral gain.

The processor 130 is further programmed to determine a final pump command $PC_F$ based on the feedback correction FC and a nominal pump command $PC_N$. The processor 130 is further programmed to generate the pump command signal associated with the pump command $PC_F$. The pump command $PC_F$ can be determined by Equation 9:

$$PC_F = PC_N + FC \qquad \text{Eq. 9}$$

The pump 108 operates at a target pump speed to pump the coolant at a target flow rate, in response to the pump 108 receiving the pump command signal from the processor 130.

In another non-limiting example, the system 102 uses cascaded loop Proportional Integral Control Structure (PI Control Structure) to determine the feedback correction FC. More specifically, the processor 130 is programmed to determine the measured delta temperature $dT_m$ based on the temperature signals received from the associated inlet and outlet temperature sensors 120, 122. The processor 130 is further programmed to determine a low-pass filtered measured delta temperature $dT_{mf}$ based on the measured delta temperature $dT_m$, the time step $\Delta t$ of the control loop used in software implementation, the time constant $\tau$ associated with the low-pass filter, and the loop instant number k. The low-pass filtered measured delta temperature $dT_{mf}$ can be determined by Equation 10:

$$dT_{mf}(k+1) = dT_{mf}(k)\left(1 - \frac{\Delta t}{\tau}\right) + \frac{\Delta t}{\tau}dT_m \qquad \text{Eq. 10}$$

The processor 130 is further programmed to determine a low-pass filtered measured delta temperature set point $dT_{Spf}$ based on the unfiltered delta temperature set point $dT_{Sp}$, the time step $\Delta t$ of the control loop used in software implementation, the time constant $\tau$ associated with the low-pass filter, and the loop instant number k. The low-pass filtered measured delta temperature set point $dT_{Spf}$ can be determined by Equation 11:

$$dT_{Spf}(k+1) = dT_{Spf}(k)\left(1 - \frac{\Delta t}{\tau}\right) + \frac{\Delta t}{\tau}dT_{Sp} \qquad \text{Eq. 11}$$

The processor 130 is further programmed to determine a nominal delta pressure $dP_{nom}$ based on the coefficient $a_{Lam}$ of laminar flow associated with the coolant, the viscosity $\mu_{T,avg}$ of the coolant at the average temperature of the coolant, the estimated nominal flow rate $dV_{Stack}$ of the coolant, the coefficient $a_{Turb}$ of turbulent flow associated with the coolant, and the density $\rho_{T,avg}$ of the coolant at an average temperature of the coolant. The nominal delta pressure $dP_{nom}$ can be determined by Equation 12:

$$dP_{nom} = a_{Lam} \mu_{T,avg} dV_{Stack} + a_{Turb} \rho_{T,avg} (dV_{Stack})^2 \qquad \text{Eq. 12}$$

The processor 130 is further programmed to determine a delta pressure set point $dP_{Sp}$ based on the nominal delta pressure $dP_{nom}$, the low-pass filtered measured delta temperature set point $dT_{Spf}$, and the low-pass filtered measured delta temperature $dT_{mf}$. The delta pressure set point $dP_{Sp}$ can be determined by Equation 13:

$$dP_{Sp} = dP_{Nom} + (dT_{Spf} - dT_{mf}) * PG + \int (dT_{Spf} - dT_{mf}) * IG * dt \qquad \text{Eq. 13}$$

where PG represents proportional gain; and IG represents integral gain.

The processor 130 is further programmed to determine the feedback correction FC based on the delta pressure set point $dP_{Sp}$ and the measured pressure drop $dP_m$. The feedback correction FC can be determined by Equation 14:

$$FC = (dP_{Sp} - dP_m) * PG + \int (dP_{Sp} - dP_m) * IG * dt \qquad \text{Eq. 14}$$

where PG represents proportional gain; and IG represents integral gain.

The processor 130 is further programmed to determine the final pump command $PC_F$ based on a nominal pump command $PC_N$ and the feedback correction FC. The pump command $PC_F$ can be determined by Equation 9 above. The processor 130 is further programmed to generate the pump command signal associated with the pump command $PC_F$. The pump 108 operates at a target pump speed to pump the coolant at the target flow rate, in response to the pump 108 receiving the pump command signal from the processor 130.

In still another non-limiting example, the system 102 compares a rate of change in stack coolant pressure drop to a calibratable threshold for determining whether to use either a measured delta temperature or a measured pressure drop for determining a feedback correction FC. More specifically, the processor 130 is further programmed to determine a rate $\dot{d}p$ of the pressure drop of the coolant, in response to the processor receiving the pressure signal from the pressure sensor 126. The processor 130 is further programmed to compare the rate $\dot{d}p$ of the pressure drop to the calibratable threshold.

In response to the processor 130 determining that the rate $\dot{d}p$ of the pressure drop is above the calibratable threshold, the processor 130 is further programmed to determine the estimated flow rate $dV_{Stack}$ according to Equation 1 above, the waste heat $\dot{Q}$ according to Equation 2 above, and the estimated delta temperature $dT_p$ according to Equation 3 above. The processor 130 defines the delta temperature feedback $dT_{Feedback}$ as the estimated delta temperature $dT_p$ and determines the feedback correction FC according to Equation 8 above. The processor 130 is further programmed to determine the final pump command $PC_F$ according to Equation 9 above and generate the pump command signal associated with the pump command $PC_F$.

In response to the processor 130 determining that the rate $\dot{d}p$ of the pressure drop is below the calibratable threshold, the processor 130 is further programmed to define the delta temperature feedback $dT_{Feedback}$ as the measured delta temperature $dT_m$ based on the temperature signals received from the associated inlet and outlet temperature sensors 120, 122. The processor 130 is further programmed to determine the feedback correction FC according to Equation 7 above. The processor 130 is further programmed to determine the feedback correction FC according to Equation 8 above. The processor 130 is further programmed to determine the final pump command $PC_F$ according to Equation 9 above. The processor 130 is further programmed to generate the pump command signal associated with the pump command $PC_F$.

Figure 2:
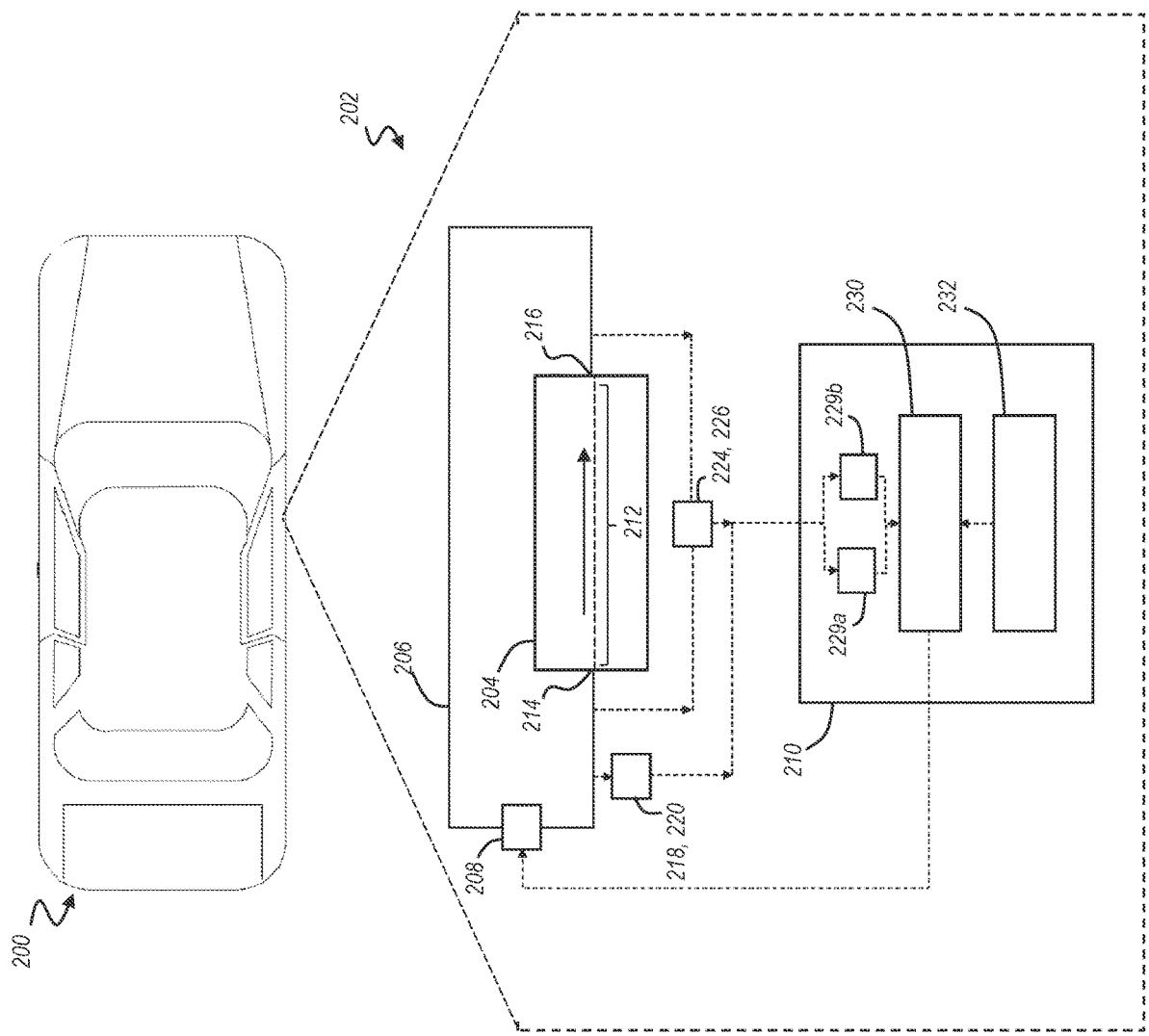
FIG. 2 is a schematic view of another example of the fuel cell electric vehicle of FIG. 1, illustrating the fuel cell propulsion system having a single temperature sensor for measuring a temperature of coolant.

Referring to FIG. 2, another example of a motor vehicle 200 having a fuel cell propulsion system 202 is similar to the motor vehicle 100 of FIG. 1 and includes identical components identified by the same reference numbers increased by 100. However, while the system 102 of FIG. 1 includes two temperature sensors 118, the system 202 includes a single temperature sensor 218 coupled to the coolant passage 206 and positioned upstream of the coolant section 212. In this example, the single temperature sensor 218 is an inlet temperature sensor 220 coupled to or fluidly connected to the inlet 214 of the coolant section 212. It is contemplated that the temperature sensor can be positioned downstream of the coolant section, and in still other examples, the system can include more than two temperature sensors coupled to the coolant passage.

Figure 3:
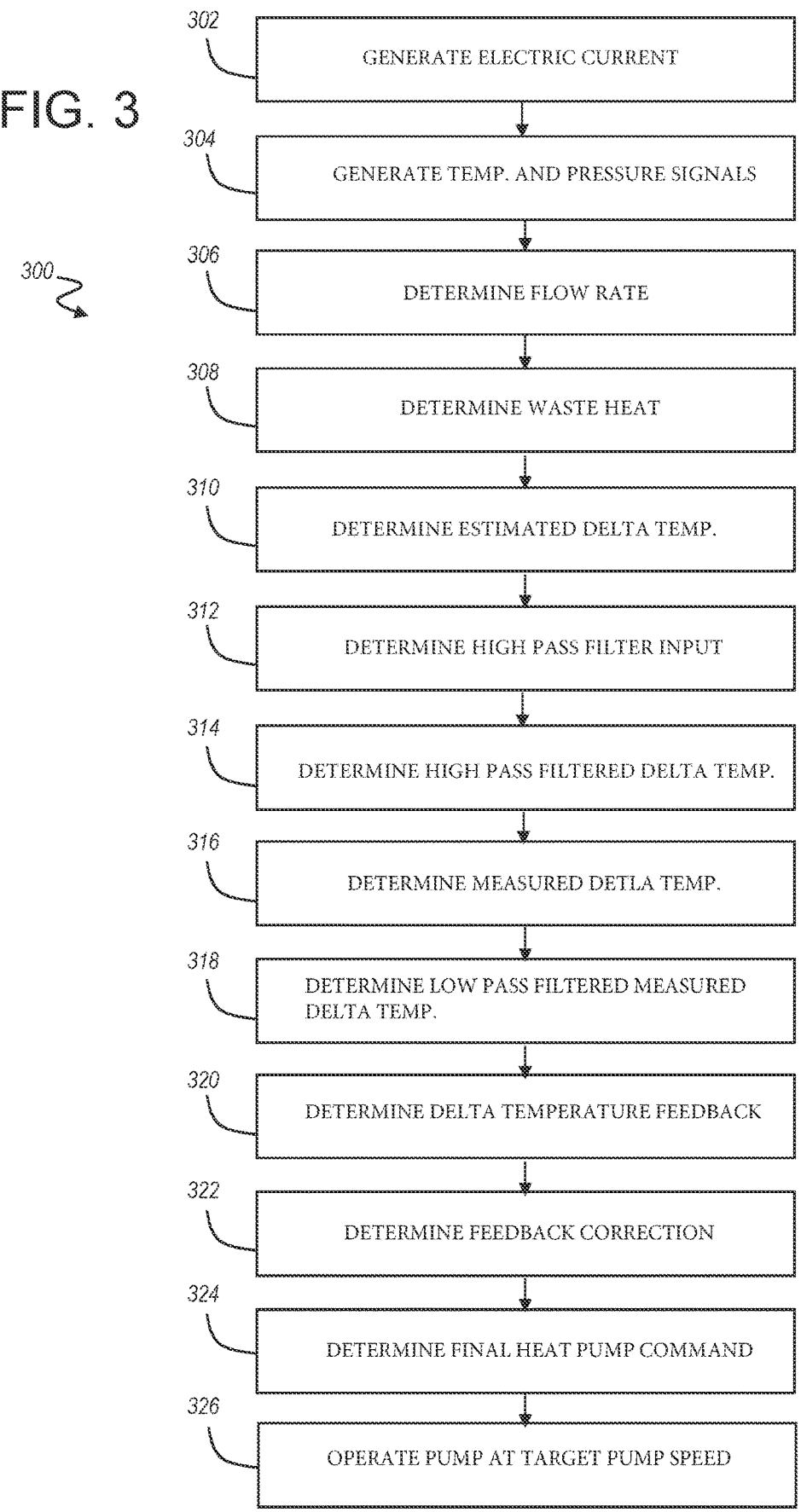
FIG. 3 is a flow chart of one example of a process for operating the system of FIG. 1.

Referring now to FIG. 3, one non-limiting example of a process 300 uses complimentary high-pass- and low-pass filters for real-time signal blending to determine the feedback correction FC for operating the fuel cell propulsion system 102 illustrated in FIG. 1. The process 300 commences at block 302 with the fuel cell stack 104 generating an electrical current with an associated waste heat.

At block 304, the coolant flows through the coolant passage 106. One or more temperature sensors 118, 120, 122 generate a temperature signal associated with a temperature of the coolant, and one or more pressure sensors 124, 126 a pressure signal associated with a pressure drop of the coolant across the fuel cell stack 104.

At block 306, the processor 130 determines the estimated flow rate $dV_{Stack}$ of the coolant through the coolant passage 106 according to Equation 1 above, based on the measured pressure drop $dP_m$ across only the fuel cell stack 104, the coefficient $a_L$ am of laminar flow associated with the coolant, the viscosity $\mu_{T,avg}$ of the coolant, the coefficient $a_{Turb}$ of turbulent flow associated with the coolant, and the density $\rho_{T,avg}$ of the coolant.

At block 308, the processor 130 determines the waste heat Q generated by the fuel cell stack 104 according to Equation 2 above, based on the ideal voltage $V_{Ideal}$ from the fuel cell stack 104, the actual voltage V from the fuel cell stack 104, and the actual current I generated by the fuel cell stack 104.

At block 310, the processor 130 determines the estimated delta temperature $dT_p$ according to Equation 3 above, based on the estimated flow rate $dV_{Stack}$, the waste heat $\dot{Q}$ generated by the fuel cell stack 104, the density $\rho$ of the coolant, and the specific heat capacity $C_p$ of the coolant.

At block 312, the processor 130 determines the high-pass filter input $\Delta dT_p$ according to Equation 4 above based on the estimated delta temperature $dT_p$.

At block 314, the processor 130 determines the high-pass filtered delta temperature $dT_{pf}$ according to Equation 5 above, based on the time step $\Delta t$ and the time constant $\tau$.

At block 316, the processor 130 determines a measured delta temperature $dT_m$ based on the temperature signals received from the associated inlet and outlet temperature sensors 120, 122, with the measured delta temperature $dT_m$ being the difference between the outlet and inlet temperatures.

At block 318, the processor 130 determines the low-pass filtered measured delta temperature $dT_{mf}$ according to Equation 6 above, based on the time step $\Delta t$, the measured delta temperature $dT_m$, the time constant $\tau$ associated with the low-pass filter, and the loop instant number k.

At block 320, the processor 130 determines delta temperature feedback $dT_{Feedback}$ according to Equation 7 above, based on the high-pass filtered delta temperature $dT_{pf}$, the low-pass filtered measured delta temperature $dT_{mf}$, and the loop instant number k.

At block 322, the processor 130 determines the feedback correction FC according to Equation 8 above, based on the delta temperature feedback $dT_{Feedback}$ and a delta temperature set point $dT_{Sp}$.

At block 324, the processor 130 determines the final pump command $PC_F$ according to Equation 9 above, based on the nominal pump command $PC_N$ and the feedback correction FC. The processor 130 generates the pump command signal associated with the pump command $PC_F$.

At block 326, the pump 108 operates at the target pump speed to pump the coolant at the target flow rate, in response to the pump 108 receiving the pump command signal from the processor 130.

Figure 4:
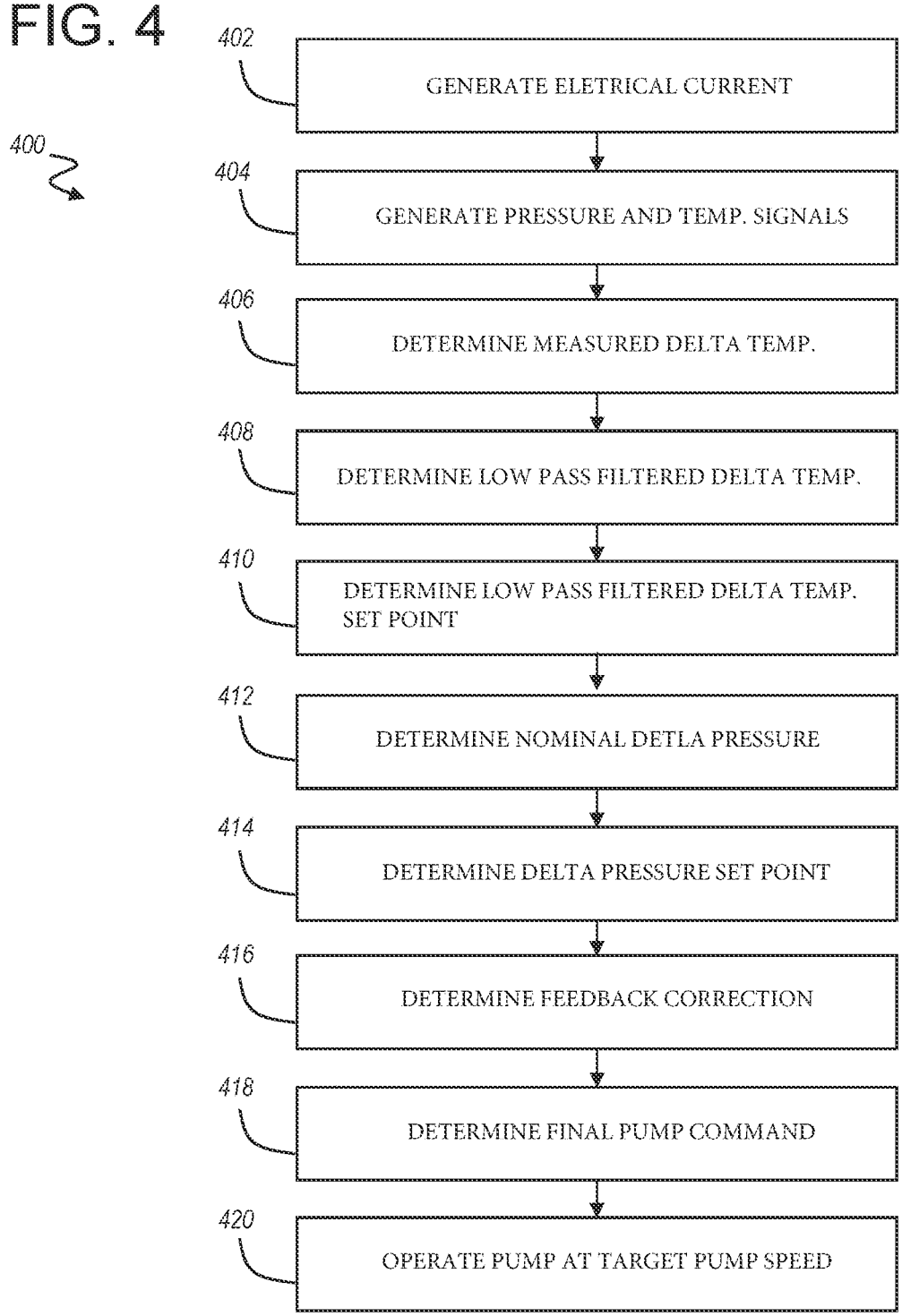
FIG. 4 is a flow chart of another example of a process for operating the system of FIG. 1.

Referring now to FIG. 4, another non-limiting example of a process 400 uses a cascaded loop PI Control Structure to determine the feedback correction FC. The process 400 begins at block 402 with the fuel cell stack 104 generating the electrical current with the associated waste heat.

At block 404, the coolant flows through the coolant passage. One or more temperature sensors 118, 120, 122 generate the temperature signal associated with the temperature of the coolant, and one or more pressure sensors 124, 126 generate the pressure signal associated with the pressure drop of the coolant across the fuel cell stack 104.

At block 406, the processor 130 determines the measured delta temperature $dT_m$ based on the temperature signals received from the associated inlet and outlet temperature sensors 120, 122.

At block 408, the processor 130 determines determine the low-pass filtered measured delta temperature $dT_{mf}$ according to Equation 10 above, based on the measured delta temperature $dT_m$, the time step $\Delta t$ of the control loop used in software implementation, the time constant $\tau$ associated with the low-pass filter, and the loop instant number k.

At block 410, the processor 130 determines the low-pass filtered measured delta temperature set point $dT_{Spf}$ according to Equation 11 above, based on the unfiltered delta temperature set point $dT_{Sp}$, the time step $\Delta t$ of the control loop used in software implementation, the time constant $\tau$ associated with the low-pass filter, and the loop instant number k.

At block 412, the processor 130 determines the nominal delta pressure $dP_{nom}$ according to Equation 12 above, based on the coefficient $a_{Lam}$ of laminar flow associated with the coolant, the viscosity $\mu_{T,avg}$ of the coolant at the average temperature of the coolant, the estimated nominal flow rate $dV_{Stack}$ of the coolant, the coefficient $a_{Turb}$ of turbulent flow associated with the coolant, and the density $\rho_{T,avg}$ of the coolant at an average temperature of the coolant.

At block 414, the processor 130 determines the delta pressure set point $dP_{Sp}$ according to Equation 13 above, based on the nominal delta pressure $dP_{nom}$, the low-pass filtered measured delta temperature set point $dT_{Spf}$, and the low-pass filtered measured delta temperature $dT_{mf}$.

At block 416, the processor 130 determines the feedback correction FC according to Equation 14 above, based on the delta pressure set point $dP_{Sp}$ and the measured pressure drop $dP_m$.

At block 418, the processor 130 determines the final pump command $PC_F$ according to Equation 9 above, based on the nominal pump command $PC_N$ and the feedback correction FC. The processor 130 generate the pump command signal associated with the pump command $PC_F$.

At block 420, the pump 108 operates at the target pump speed to pump the coolant at the target flow rate, in response to the pump 108 receiving the pump command signal from the processor 130.

Figure 5:
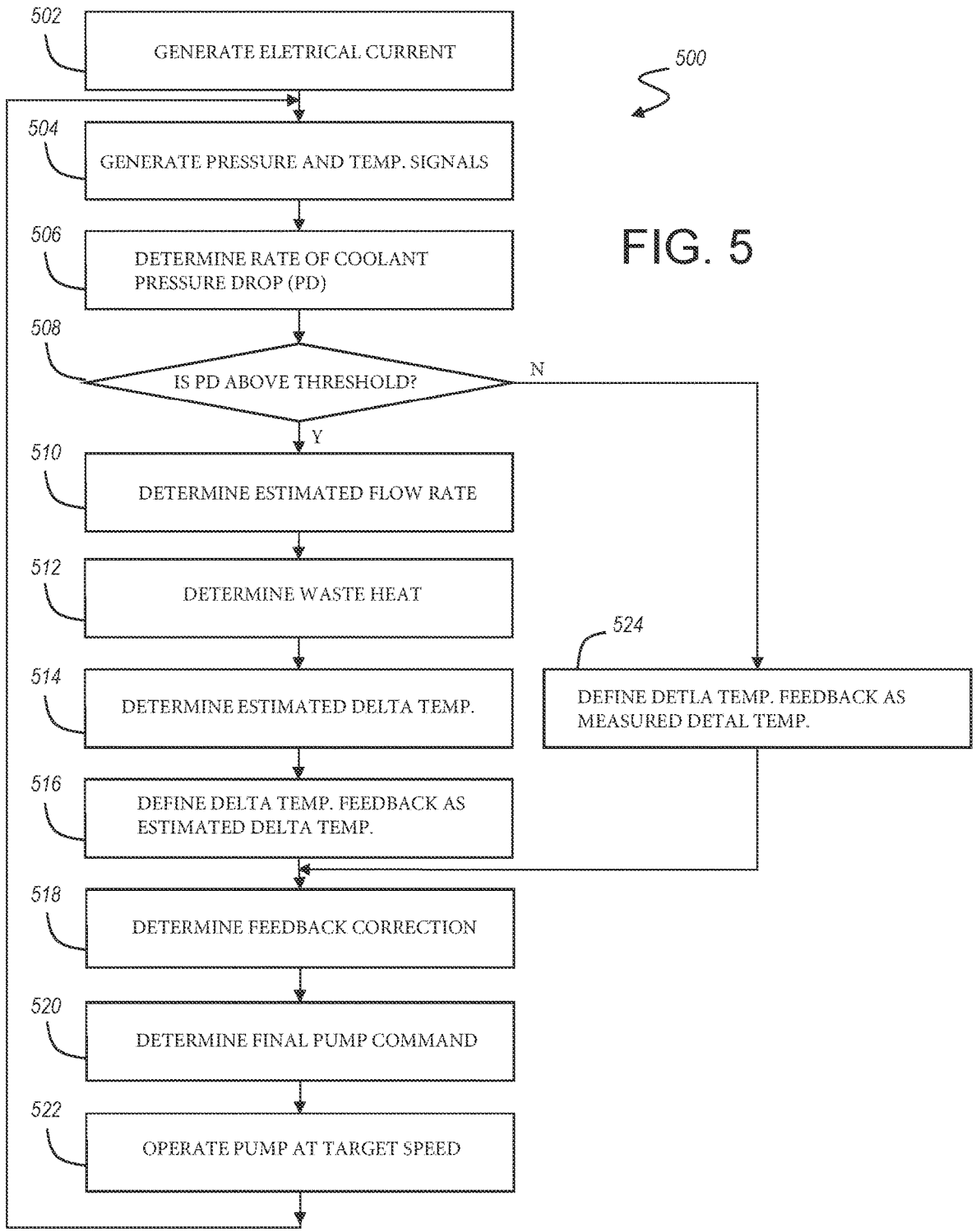
FIG. 5 is a flow chart of yet another example of a process for operating the system of FIG. 1.

Referring now to FIG. 5, still another non-limiting example of a process 500 that combines the measured delta pressure feedback $dP_m$ and the measured delta temperature feedback $dT_m$ to determine the feedback correction FC. The process 500 begins at block 502 with the fuel cell stack 104 generating the electrical current with an associated waste heat.

At block 504, the coolant flows through the coolant passage. One or more temperature sensors 118, 120, 122 generate the temperature signal associated with the temperature of the coolant, and one or more pressure sensors 124, 126 the pressure signal associated with the pressure drop of the coolant across the fuel cell stack 104.

At block 506, the processor 130 determines the rate $\dot{dp}$ of the pressure drop of the coolant, in response to the processor receiving the pressure signal from the pressure sensor 126 at two or more instants of time.

At block 508, the processor 130 compares the rate $\dot{dp}$ of the pressure drop to the calibratable threshold. If the rate $\dot{dp}$ is above the threshold, the process 500 proceeds to block 510. If the rate $\dot{dp}$ is below the threshold, the process 500 proceeds to block 524.

At block 510, the processor 130 the processor 130 determines the estimated flow rate $dV_{Stack}$ of the coolant through the coolant passage 106 according to Equation 1 above, based on the measured pressure drop $dP_m$ across only the fuel cell stack represents, the coefficient $a_{Lam}$ of laminar flow associated with the coolant, the viscosity $\mu_{T,avg}$ of the coolant, the coefficient $a_{Turb}$ of turbulent flow associated with the coolant, and the density $\rho_{T,avg}$ of the coolant.

At block 512, the processor 130 determines the waste heat Q generated by the fuel cell stack 104 according to Equation 2 above, based on the ideal voltage $V_{Ideal}$ from the fuel cell stack 104, the actual voltage V from the fuel cell stack 104, and the actual current I generated by the fuel cell stack 104.

At block 514, the processor 130 determines the estimated delta temperature $dT_p$ according to Equation 3 above, based on the estimated flow rate $dV_{Stack}$, the waste heat $\dot{Q}$ generated by the fuel cell stack 104, the density p of the coolant, and the specific heat capacity $C_p$ of the coolant.

At block 516, the processor 130 defines the delta temperature feedback $dT_{Feedback}$ as the estimated delta temperature $dT_p$.

At block 518, the processor 130 further determines the feedback correction FC according to Equation 8 above, based on the delta temperature feedback $dT_{Feedback}$ and a delta temperature set point $dT_{Sp}$.

At block 520, the processor 130 determines the final pump command $PC_F$ according to Equation 9 above based on the nominal pump command $PC_N$ and the feedback correction FC. The processor 130 generate the pump command signal associated with the pump command $PC_F$.

At block 522, the pump 108 operates at the target pump speed to pump the coolant at the target flow rate, in response to the pump 108 receiving the pump command signal from the processor 130. The process 500 the returns to block 504.

At block 524, the processor 130 defines the delta temperature feedback $dT_{Feedback}$ as the measure delta temperature dT, which in this example is the difference between the outlet coolant temperature and the inlet coolant temperature. The process 500 then proceeds to block 518.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMULINK, STATEFLOW, VISUAL BASIC, JAVA SCRIPT, PERL, HTML, TENSORFLOW, PYTHON, PYTORCH, KERAS, etc. Some of these applications may be compiled and executed on a virtual machine, such as the JAVA virtual machine, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM (also referred to as a processor readable medium) participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In some examples, system elements may be implemented as computer readable instructions (e.g., software) on one or more computing devices, stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer for a fuel cell propulsion system of a motor vehicle, the fuel cell propulsion system having a fuel cell stack, a coolant passage having a coolant section coupled to the fuel cell stack and flowing a coolant through the fuel cell stack, with the coolant passage further including an inlet positioned upstream of the coolant section and an outlet positioned downstream of the coolant section, at least one temperature sensor attached to the inlet or to the outlet and generating a temperature signal associated with a temperature of the coolant at the inlet or the outlet, at least one pressure sensor generating a pressure signal associated with a pressure drop of the coolant across the fuel cell stack, and a pump for pumping the coolant through the coolant passage to remove the waste heat from the fuel cell stack, the computer comprising:

at least one processor receiving the temperature signal from the at least one temperature sensor and the pressure signal from the at least one pressure sensor; and a non-transitory computer readable storage medium including instructions such that the at least one processor is programmed to:

determine a feedback correction based on the temperature of the coolant and the pressure drop of the coolant across the fuel cell stack, wherein the feedback correction is an adjustment calculated using a proportional integral controller to meet a target flow rate of the coolant; and generate a pump command signal by summing the feedback correction with a nominal pump command, with the pump command signal actuating the pump to operate at a target pump speed for pumping the coolant at the target flow rate.

2. The computer of claim 1 wherein the at least one processor is further programmed to determine the feedback correction based on a delta temperature set point and a delta temperature feedback.

3. The computer of claim 2 wherein the at least one processor is further programmed to:

determine a waste heat based on an ideal voltage from the fuel cell stack, an actual voltage from the fuel cell stack, an actual current generated by the fuel cell stack, and a latent heat;

determine an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and a density of the coolant at an average temperature of the coolant; and determine an estimated delta temperature associated with the pressure drop based on the waste heat, the estimated flow rate, a density of the coolant, and a specific heat capacity of the coolant.

4. The computer of claim 3 wherein the at least one processor is further programmed to:
determine a high-pass filter input based on the estimated delta temperature and a loop instant number;
determine a high-pass filtered delta temperature associated with the pressure drop based on the high-pass filter input, the loop instant number, a time step, and a time constant associated; and
determine the delta temperature feedback based on the high-pass filtered delta temperature, a low-pass filtered measured delta temperature associated with the temperature of the coolant, and the loop instant number.

5. The computer of claim 4 wherein the at least one processor is further programmed to:
determine a measured delta temperature based on the temperature signal received from the at least one temperature sensor; and
determine the low-pass filtered measured delta temperature based on the measured delta temperature, the time step, the loop instant number, and the time constant.

6. The computer of claim 3 wherein the at least one processor is further programmed to:
determine a rate of change of the pressure drop in response to the at least one processor receiving the pressure signal from the at least one pressure sensor;
compare the rate of change of the pressure drop to a calibratable threshold; and
define the delta temperature feedback as the estimated delta temperature in response to the at least one processor determining that the rate of change of the pressure drop is above the calibratable threshold.

7. The computer of claim 6 wherein the at least one processor is further programmed to:
determine a measured delta temperature in response to the at least one processor receiving the temperature signal from the at least one temperature sensor; and
define the delta temperature feedback as the measured delta temperature in response to the at least one processor determining that the rate of change of the pressure drop is below the calibratable threshold.

8. The computer of claim 1 wherein the at least one processor is further programmed to determine the feedback correction based on a delta pressure set point and the pressure drop.

9. The computer of claim 8 wherein the at least one processor is further programmed to determine the delta pressure set point based on a nominal delta pressure, a low-pass filtered measured delta temperature set point, and a low-pass filtered measured delta temperature.

10. The computer of claim 9 wherein the at least one processor is further programmed to determine the low-pass filtered measured delta temperature set point based on an unfiltered delta temperature set point, a time step, a loop instant number, and a time constant associated with a low-pass filter.

11. The computer of claim 10 wherein the at least one processor is further programmed to determine the low-pass filtered measured delta temperature based on a measured delta temperature associated with the temperature signal, the time step, the loop instant number, and the time constant.

12. The computer of claim 11 wherein the at least one processor is further programmed to determine the measured delta temperature in response to the at least one processor receiving the temperature signal from the at least one temperature sensor.

13. A fuel cell propulsion system for a motor vehicle, the fuel cell propulsion system comprising:
a fuel cell stack for generating an electrical current with an associated waste heat;
a coolant passage having a coolant section coupled to the fuel cell stack and flowing a coolant through the fuel cell stack for removing the waste heat, with the coolant passage further including an inlet positioned upstream of the coolant section and an outlet positioned downstream of the coolant section;
at least one temperature sensor attached to the coolant passage at the inlet or at the outlet of the coolant section and generating a temperature signal associated with a temperature of the coolant at the inlet or at the outlet;
at least one pressure sensor attached to the coolant section of the coolant passage and generating a pressure signal associated with a pressure drop across the fuel cell stack;
a computer comprising:
at least one processor; and
a non-transitory computer readable storage medium including instructions such that the at least one processor is programmed to:
determine a feedback correction based on the pressure drop of the coolant across the fuel cell stack and the temperature of the coolant in response to the at least one processor receiving the temperature signal from the at least one temperature sensor and the pressure signal from the at least one pressure sensor, wherein the feedback correction is an adjustment calculated using a proportional integral controller to meet a target flow rate of the coolant; and
generate a pump command signal by summing the feedback correction with a nominal pump command; and
a pump fluidly connected to the coolant passage and operating at a target pump speed for pumping the coolant through the coolant passage at the target flow rate in response to the pump receiving the pump command signal from the at least one processor.

14. The fuel cell propulsion system of claim 13 wherein the at least one temperature sensor comprises a single temperature sensor.

15. The fuel cell propulsion system of claim 13 wherein the at least one temperature sensor comprises:
an inlet temperature sensor attached to the coolant passage and positioned upstream of the coolant section, with the inlet temperature sensor generating an inlet temperature signal associated with an inlet temperature of the coolant upstream of the coolant section; and
an outlet temperature sensor attached to the coolant passage and positioned downstream of the coolant section, with the outlet temperature sensor generating an outlet temperature signal associated with an outlet temperature of the coolant downstream of the coolant section.

16. A process of operating a fuel cell propulsion system for a motor vehicle, with the fuel cell propulsion system including a fuel cell stack, a coolant passage having a coolant section coupled to the fuel cell stack and flowing a coolant through the fuel cell stack, with the coolant passage further including an inlet positioned upstream of the coolant section and an outlet positioned downstream of the coolant section, at least one temperature sensor attached to the inlet or to the outlet of the coolant section, at least one pressure sensor attached to the coolant passage, a pump, and a computer having at least one processor and a non-transitory computer readable storage medium for storing instructions, the process comprising:
  generating, using the fuel cell stack, an electrical current with an associated waste heat;
  flowing the coolant through the coolant passage;
  generating, using the at least one temperature sensor, a temperature signal associated with a temperature of the coolant at either the inlet or the outlet;
  generating, using the at least one pressure sensor, a pressure signal associated with a pressure drop of the coolant across the fuel cell stack;
  determining, using the at least one processor, a feedback correction based on the pressure drop of the coolant across the fuel cell stack and the temperature of the coolant in response to the at least one processor receiving the temperature signal from the at least one temperature sensor and the pressure signal from the at least one pressure sensor, wherein the feedback correction is an adjustment calculated using a proportional integral controller to meet a target flow rate of the coolant;
  generating a pump command signal by summing the feedback correction and a nominal pump command; and
  operating the pump at a target pump speed determined by the pump command signal to pump the coolant through the coolant passage at the target flow rate.

17. The process as recited in claim 16, further comprising determining, using the at least one processor, the feedback correction based on a delta temperature set point and a delta temperature feedback.

18. The process as recited in claim 17, further comprising:
  determining, using the at least one processor, a waste heat based on an ideal voltage from the fuel cell stack, an actual voltage from the fuel cell stack, an actual current generated by the fuel cell stack, and a latent heat;
  determining, using the at least one processor, an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and a density of the coolant at an average temperature of the coolant;
  determining, using the at least one processor, an estimated delta temperature associated with the pressure drop based on the waste heat, the estimated flow rate, a density of the coolant, and a specific heat capacity of the coolant;
  determining, using the at least one processor, a high-pass filter input based on the estimated delta temperature and a loop instant number;
  determining, using the at least one processor, a high-pass filtered delta temperature associated with the pressure drop based on the high-pass filter input, a time constant associated with the high-pass filter, a time step, the loop instant number, and a low-pass filter;
  determining, using the at least one processor, a measured delta temperature in response to the at least one processor receiving the temperature signal from the at least one temperature sensor;
  determining, using the at least one processor, a low-pass filtered measured delta temperature associated with the temperature of the coolant based on the measured delta temperature, the time step, the loop instant number, and the time constant; and
  determining, using the at least one processor, the delta temperature feedback based on the high-pass filtered delta temperature, the low-pass filtered measured delta temperature, and the loop instant number.

19. The process as recited in claim 17, further comprising:
  determining, using the at least one processor, a rate of change of the pressure drop of the coolant;
  comparing, using the at least one processor, the rate of change of the pressure drop to a calibratable threshold;
  defining the delta temperature feedback as a measured delta temperature based on the temperature signal, in response to the at least one processor determining that the rate of change of the pressure drop is less than the calibratable threshold; and
  defining the delta temperature feedback as an estimated delta temperature based on the pressure signal, in response to the at least one processor determining that the rate of change of the pressure drop is above the calibratable threshold;
  wherein setting the delta temperature feedback as the estimated delta temperature comprises:
    determining, using the at least one processor, a waste heat generated by the fuel cell stack based on an ideal voltage from the fuel cell stack, an actual voltage from the fuel cell stack, an actual current generated by the fuel cell stack, and a latent heat;
    determining, using the at least one processor, an estimated flow rate of the coolant through the coolant passage based on the pressure drop, a coefficient of laminar flow associated with the coolant, a viscosity of the coolant at the average temperature of the coolant, a coefficient of turbulent flow associated with the coolant, and the density of the coolant; and
    determining, using the at least one processor, the estimated delta temperature based on the waste heat, the estimated flow rate, a density of the coolant, and a specific heat capacity of the coolant.

20. The process as recited in claim 16, further comprising:
  determining, using the at least one processor, a measured delta temperature in response to the at least one processor receiving the temperature signal from the at least one temperature sensor;
  determining, using the at least one processor, a low-pass filtered measured delta temperature based on the measured delta temperature associated, a time step, a loop instant number, and a time constant associated with a low-pass filter;
  determining, using the at least one processor, a low-pass filtered measured delta temperature set point based on an unfiltered delta temperature set point, the time step, the loop instant number, and the time constant;
  determining, using the at least one processor, a nominal delta pressure based on a coefficient of laminar flow associated with the coolant, a viscosity of the coolant at the average temperature of the coolant, an estimated flow rate of the coolant, a coefficient of turbulent flow associated with the coolant, and a density of the coolant at an average temperature of the coolant;
  determining, using the at least one processor, a delta pressure set point based on the nominal delta pressure, the low-pass filtered measured delta temperature, and the low-pass filtered measured delta temperature set point; and determining, using the at least one processor, the feedback correction based on the delta pressure set point and the pressure drop.

\* \* \* \* \*